(12) United States Patent
Knittel et al.

(10) Patent No.: US 9,541,434 B2
(45) Date of Patent: Jan. 10, 2017

(54) SENSOR SYSTEM

(71) Applicant: CONTINENTAL AUTOMOTIVE GMBH, Hannover (DE)

(72) Inventors: Thorsten Knittel, Pentling (DE); Stephan Schürer, Regensburg (DE); Stephen Setescak, Pentling (DE)

(73) Assignee: Continental Automotive GmbH, Hannover (DE)

( * ) Notice: Subject to any disclaimer, the term of this patent is extended or adjusted under 35 U.S.C. 154(b) by 212 days.

(21) Appl. No.: 14/368,138

(22) PCT Filed: Nov. 30, 2012

(86) PCT No.: PCT/EP2012/074036
§ 371 (c)(1),
(2) Date: Jun. 23, 2014

(87) PCT Pub. No.: WO2013/092167
PCT Pub. Date: Jun. 27, 2013

(65) Prior Publication Data
US 2015/0000394 A1    Jan. 1, 2015

(30) Foreign Application Priority Data

Dec. 23, 2011   (DE) .......................... 10 2011 089 897

(51) Int. Cl.
| | | |
|---|---|---|
| G01F 1/696 | (2006.01) | |
| G01D 21/02 | (2006.01) | |
| G01F 1/684 | (2006.01) | |

(52) U.S. Cl.
CPC ............... G01F 1/696 (2013.01); G01D 21/02 (2013.01); G01F 1/6845 (2013.01); *G01K 2205/02* (2013.01)

(58) Field of Classification Search
CPC ......... H01R 29/00; G01F 1/696; G01F 1/6965
(Continued)

(56) References Cited

U.S. PATENT DOCUMENTS 5,517,971 A * 5/1996 Nishimura ............ F02D 11/106
                                                     123/494
6,810,345 B2 * 10/2004 Matsumura ............. G01F 1/696
                                                     702/100
(Continued)

FOREIGN PATENT DOCUMENTS

| CN | 1268659 | 10/2000 |
|---|---|---|
| CN | 101706299 | 5/2010 |

(Continued)

*Primary Examiner* — Daniel J Colilla
(74) *Attorney, Agent, or Firm* — Cozen O'Connor

(57) ABSTRACT

A sensor system has at least one first sensor element for measuring a first physical variable and a second sensor element for measuring a second physical variable. The first sensor element is part of an application-specific integrated circuit which, in addition to the first sensor element, has further electronic circuits. The second sensor element is arranged separately and outside the application-specific integrated circuit. The second sensor element is electrically connected to the application-specific integrated circuit via a first connection point. The application-specific integrated circuit is configurable via the first connection point and the measurement signal from the second sensor element can be read out via the first connection point.

5 Claims, 3 Drawing Sheets

(58) Field of Classification Search
USPC .......................................................... 73/204.18
See application file for complete search history.

(56) References Cited

U.S. PATENT DOCUMENTS

| | | | |
|---|---|---|---|
| 2004/0263351 A1* | 12/2004 | Joy ........................ | G01K 13/00 340/870.01 |
| 2005/0081621 A1* | 4/2005 | Zobel ...................... | G01F 1/698 73/204.26 |
| 2005/0120789 A1* | 6/2005 | Matsumoto ........... | G01F 1/6845 73/204.15 |
| 2007/0144250 A1* | 6/2007 | Ramsesh ............. | G01F 25/0053 73/204.22 |
| 2012/0125558 A1* | 5/2012 | Nortman ................... | G01F 1/68 165/11.1 |

FOREIGN PATENT DOCUMENTS

| | | |
|---|---|---|
| CN | 102052944 | 5/2011 |
| DE | 42 19 454 | 12/1993 |
| DE | 10 2004 038 988 | 1/2006 |
| DE | 60 2005 003 992 | 5/2008 |
| DE | 10 2009 034 937 A1 | 2/2011 |
| EP | 0 352 340 | 1/1990 |
| EP | 1 249 688 | 10/2002 |
| JP | 2002-310760 | 10/2002 |
| JP | 2005-172463 | 6/2005 |
| WO | WO 2004/090679 A2 | 10/2004 |

\* cited by examiner

SENSOR SYSTEM

CROSS-REFERENCE TO RELATED APPLICATIONS

This is a U.S. national stage of application No. PCT/EP2012/074036, filed on 30 Nov. 2012, which claims priority to the German Application No. 10 2011 089 897.2, filed 23 Dec. 2011, the content of both incorporated herein by reference.

BACKGROUND OF THE INVENTION

1. Field of the Invention

The invention relates to a sensor system having at least one first sensor element for measuring a first physical variable and a second sensor element for measuring a second physical variable, wherein the first sensor element is part of an application-specific integrated circuit that has not only the first sensor element but also further electronic circuits, and the second sensor element is arranged separately and outside the application-specific integrated circuit, wherein the second sensor element is electrically connected to the application-specific integrated circuit via a first connection point.

2. Related Art

By way of example, such sensor systems are used to record the mass flow and the temperature of a fluid flow, particularly in the automotive industry. This is of great significance, since these physical variables are measured and processed for the purpose of optimized control of internal combustion engines in motor vehicles. To this end, modern sensor systems use application-specific integrated circuits on which the first sensor element, for example the sensor element for measuring the air mass flow, is fully integrated. However, the second sensor element is arranged separately and outside the application-specific integrated circuit, for example because it is intended to record a different physical variable without being disturbed by the first sensor element. An example that can be cited in this case is a temperature sensor element that is intended to measure the temperature of the air mass flow remotely from the sensor element for measuring the air mass flow. Both sensor elements, that is to say the sensor element for measuring the air mass flow and the temperature sensor element, are parts of the sensor system, however. Therefore, the second sensor element, in this example the temperature sensor element, is electrically connected to the application-specific integrated circuit via a first connection point.

The application-specific integrated circuit needs to be programmed before the sensor system is first started up. According to the prior art, programming involves the use of at least one third interface that is not required further following the programming of the sensor system. In the case of application-specific integrated circuits, the interfaces themselves are relatively expensive assemblies, the number of which should be kept down where possible.

SUMMARY OF THE INVENTION

It is therefore an object of the invention to provide a sensor system that is as simple and inexpensive as possible.

This object is achieved by virtue of the application-specific integrated circuit being able to be configured via the first connection point and the measurement signal from the second sensor element being able to be read via the first connection point, reducing the requirement for a connection point. So long as the sensor system is programmed, it is not necessary to record measurement signals from the second sensor element. Once the programming of the sensor system has concluded, the measurement signal from the second sensor element can be transmitted to the application-specific integrated circuit in the sensor system via the first connection point.

In one embodiment of the invention, the application-specific integrated circuit with the first sensor element and the further electronic circuits is in the form of a microelectromechanical system. Microelectromechanical systems can be produced very inexpensively in large numbers, and sensors that are based on such systems usually deliver outstanding measurement results. In this case, it is advantageous if the first sensor element is in the form of a sensor element for measuring an air mass flow, since the two temperature sensor elements and the heating element of the sensor element for air mass measurement may be arranged on a thin diaphragm in the microelectromechanical system that provides outstanding isolation for the electronic environment from the heat produced by the heating element.

If the second sensor element is in the form of a sensor element for measuring a temperature, this temperature measurement value can be used for more precise evaluation of the information about the air mass flow.

If the at least one analog-to-digital converter is arranged on the application-specific integrated circuit, the analog-to-digital converter can be implemented without additional costs in practice.

In one advantageous development, a moisture sensor element is integrated in the sensor system. The moisture sensor element can be used to achieve compensation for the errors resulting from humidity during the measurement of the air mass flow.

In a subsequent development of the invention, a pressure sensor element is integrated in the sensor system. The pressure sensor element can be used to achieve compensation for the errors resulting from different air pressures during measurement of the air mass flow.

BRIEF DESCRIPTION OF THE DRAWINGS

The invention permits numerous embodiments. For further illustration, the invention is shown in more detail in the drawings and is described below. In the drawings.

DETAILED DESCRIPTION OF THE PRESENTLY PREFERRED EMBODIMENTS

Figure 1:
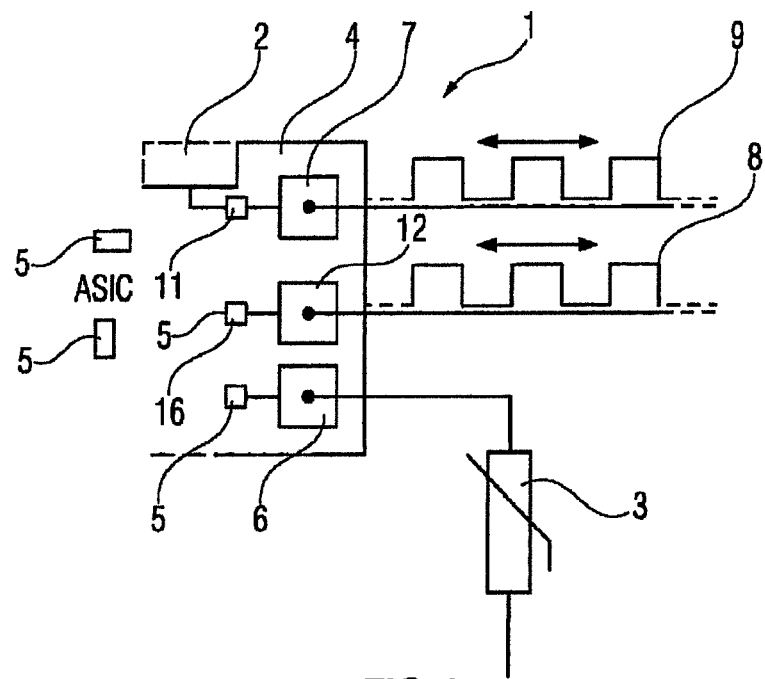
FIG. 1 shows a sensor system in the configuration case.

FIG. 1 shows a sensor system 1 having at least one first sensor element 2 for measuring a first physical variable and a second sensor element 3 for measuring a second physical variable. The first sensor element 2 is part of an application-specific integrated circuit 4 that has not only the first sensor element 2 but also further electronic circuits 5. A second sensor element 3 is arranged separately and outside the application-specific integrated circuit. The second sensor element 3 is electrically connected to the application-specific integrated circuit 4 via a first connection point 6.

FIG. 1 shows the configuration case. For the purpose of configuring or programming the application specific integrated circuit 4, a third connection point 12 is used to send a configuration signal 8. The configuration signal 8 is used to write data to a memory 16 of the application-specific integrated circuit 4. Furthermore, it can be seen that the first sensor element 2 is connected to an analog-to-digital converter 11 that digitizes the measurement signals 10 from the first sensor element 2 and supplies them to a second connection point 7. This is done only in the application case, however, that is to say in the case of the application of the sensor system 1, for example in the intake channel of an internal combustion engine.

Figure 2:
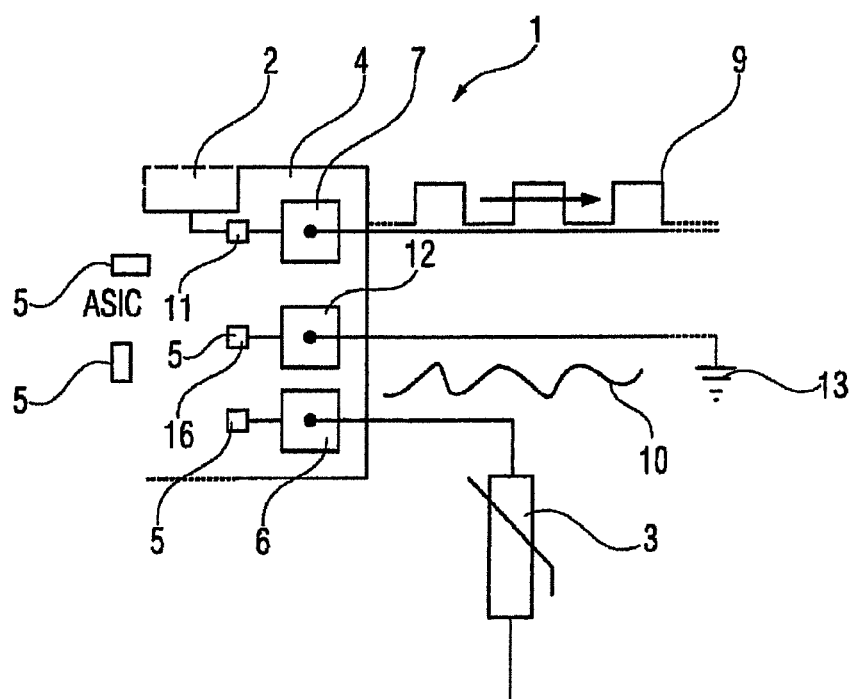
FIG. 2 shows a sensor system in the application case.

The application case is shown in FIG. 2. FIG. 2 shows the sensor system 1 known from FIG. 1, according to which the programming of the application-specific integrated circuit 4 is carried out. In this case, it can be seen that the third connection point 12 has lost its function, and it is usually set to a fixed reference-ground potential. In this case, the fixed reference-ground potential is in the form of ground 13 by way of example, but any fixed potential is suitable in principle. In the application case, the second sensor element 3, which is arranged separately and outside the application-specific integrated circuit 4, records a second physical variable. In this example, the second physical variable recorded by the second sensor element 3 is the temperature of an air mass flow. The measurement signal 10 produced by the second sensor element 3, which measurement signal may be available as a digital or analog measurement signal 10, is supplied to the application-specific integrated circuit 4 via a first connection point 6 for evaluation. For the purpose of evaluating the measurement signals, electronic circuits 5 are formed on the application-specific integrated circuit 4. Furthermore, the first sensor element 2, which in this case is in the form of a sensor element for recording an air mass flow, for example, records a first physical variable and forwards the measurement signals to an analog-to-digital converter 11, which is connected to a second connection point 7 via which the measured values both from the first sensor element 2 and from the second sensor element 3 are sent to a downstream engine controller.

Figure 3:
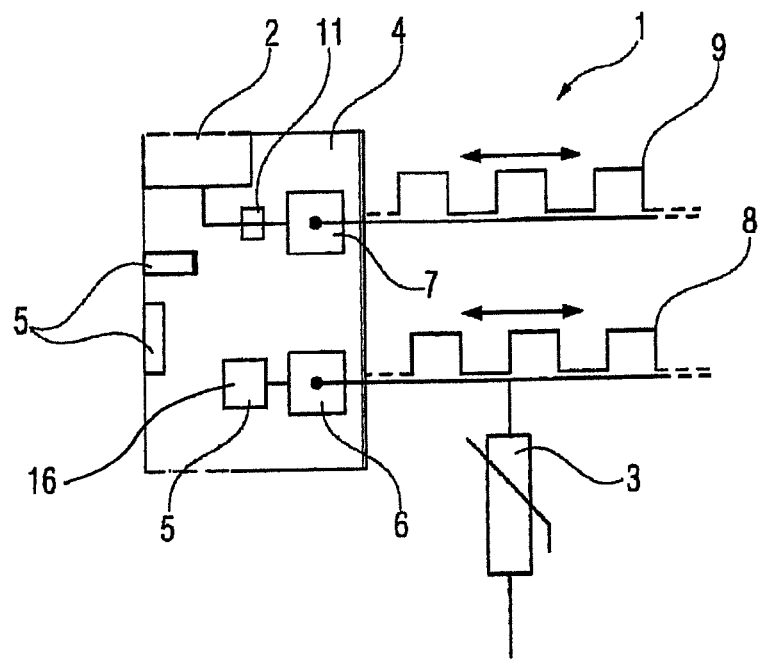
FIG. 3 shows a sensor system according to the invention in the configuration case.

FIG. 3 shows the sensor system 1 according to the invention. Again, it is possible to see the first sensor element 2 for measuring a first physical variable and the second sensor element 3 for measuring a second physical variable. In this example, too, the first sensor element 2 is in the form of a sensor element for measuring an air mass and the second sensor element 3 is in the form of a sensor element for measuring the temperature of the air mass. The first sensor element 2 is part of an application-specific integrated circuit 4. This application-specific integrated circuit 4 contains not only the first sensor element 2 but also further electronic circuits 5. The second sensor element is arranged separately and outside the application-specific integrated circuit 4. The second sensor element 3 is electrically connected to the application-specific integrated circuit 4 via a first connection point 6. The application-specific integrated circuit 4 can be configured via the first connection point 6, and the measurement signal 10 from the second sensor element 3 can be read via the first connection point 6. The measurement signal 10 shown in this case is the analog signal that is produced by the second sensor element 3. In the configuration case, as shown in FIG. 3, the second sensor element 3 does not produce a measurement signal 10, and therefore the first connection point 6 can be used to transmit the configuration signal 8 to the application-specific integrated circuit 4. In this case, the data relating to a specific application are written to the electronic memory elements 16 on the application-specific integrated circuit 4. When the programming of the application-specific integrated circuit 4 has been concluded, and the circuit is therefore fully configured, the second sensor element 3 can use the same connection point 6 to transmit measurement signals 10 to the application-specific integrated circuit 4. This is shown in FIG. 4.

Figure 4:
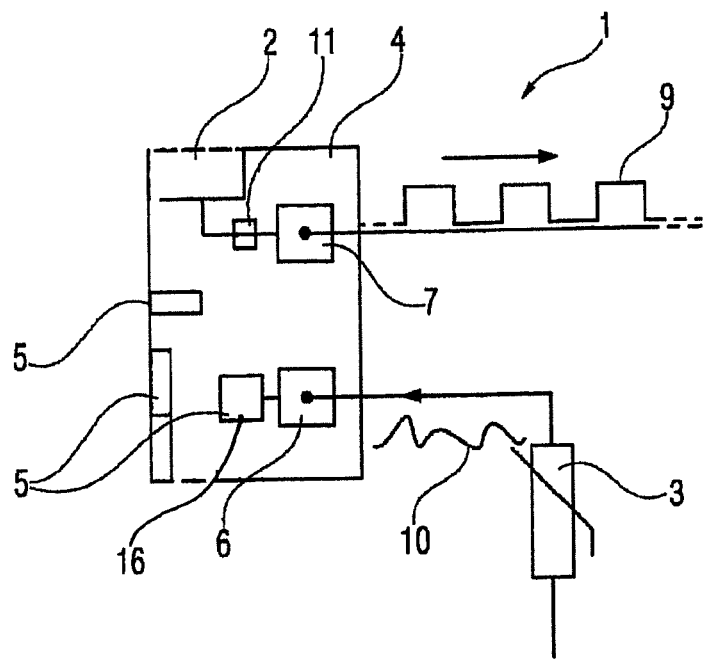
FIG. 4 shows a sensor system according to the invention in the application case.

FIGS. 3 and 4 clearly reveal that, for the purpose of programming and for the purpose of using the sensor system 1, at least one connection point fewer is required than in the examples from FIGS. 1 and 2. Therefore, the sensor system 1 according to the invention can be produced less expensively and with a simpler design than the system known from FIGS. 1 and 2.

Figure 5:
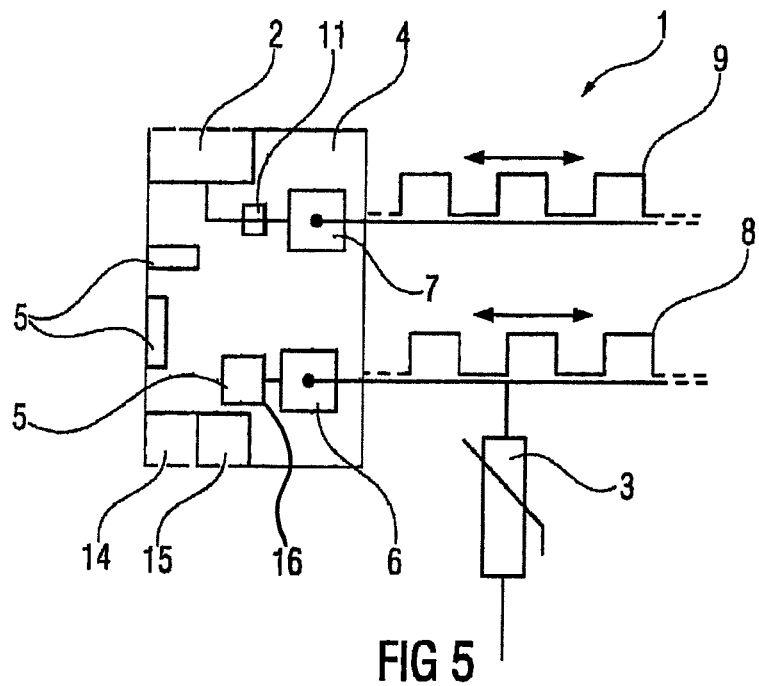
FIG. 5 shows a sensor system according to the invention for recording the mass flow and the temperature of a fluid flow in the configuration case, said sensor system additionally being equipped with a moisture sensor and a pressure sensor.
Figure 6:
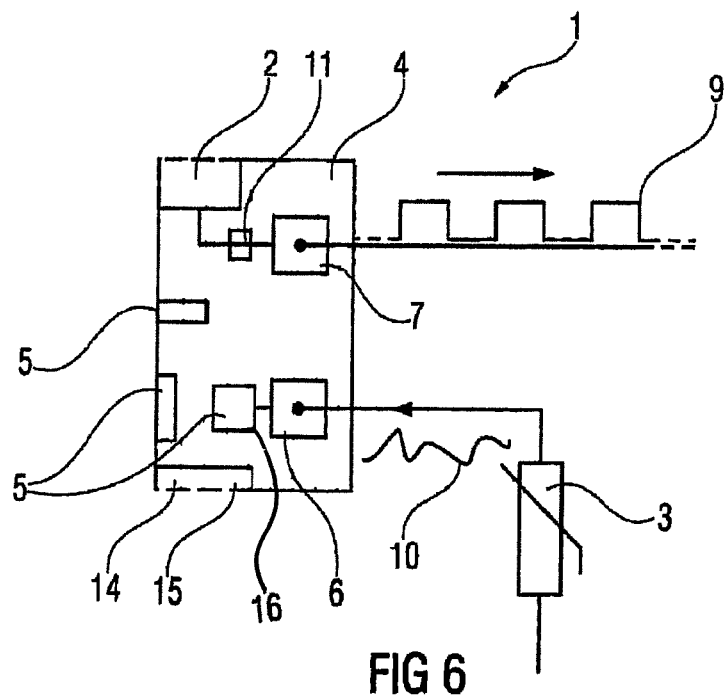
FIG. 6 shows a sensor system according to the invention for recording the mass flow and the temperature of a fluid flow in the application case, said sensor system additionally being equipped with a moisture sensor and a pressure sensor.

FIGS. 5 and 6 show the cases of programming or configuration and application of the sensor system 1 that are known from FIGS. 4 and 5, the sensor system 1 having been extended by a moisture sensor element 14 and a pressure sensor element 15 in FIGS. 4 and 5. In this case, the moisture sensor element 14 and the pressure sensor element 15 are integrated on the application-specific integrated circuit 4 as well, by way of example.

Throughout all of the figures shown, the first connection point 6, the second connection point 7 and the third connection point 12 are each in the form of a single-pole connection point with just a single bonding pad in each case.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sensor system (1) comprising:
    an application-specific integrated circuit (4) having:
        (a) at least one air mass flow sensor element (2) configured to measure an air mass flow, and
        (b) further electronic circuits (5), including electronic memory elements (16); and
    a temperature sensor element (3) configured to measure a temperature of the air mass flow, the temperature sensor element (3) being arranged separately and outside the application-specific integrated circuit (4), the temperature sensor element (3) being electrically connected to the application-specific integrated circuit (4) via a first connection point (6),
    wherein the application-specific integrated circuit (4) is configured such that:

during a configuration of the application-specific integrated circuit (4), a configuration signal (8) is transmitted to the application-specific integrated circuit (4) via the first connection point (6) to write data relating to a specific application to effect programming of the electronic memory elements (16); and upon conclusion of the programming of the application-specific integrated circuit (4) via the first connection point (6), the application-specific integrated circuit (4) is configured to read a measurement signal (10) from the temperature sensor element (3) via the first connection point (6).

2. The sensor system (1) as claimed in claim 1, wherein the application-specific integrated circuit (4) with the air mass flow sensor element (2) and the further electronic circuits (5) is a microelectromechanical system.

3. The sensor system (1) as claimed in claim 1, further comprising at least one analog-to-digital converter (11) arranged on the application-specific integrated circuit (4).

4. The sensor system (1) as claimed in claim 1, further comprising a moisture sensor element (14) configured to sense moisture.

5. The sensor system (1) as claimed in claim 1, further comprising an integrated pressure sensor element (17).

\* \* \* \* \*